United States Patent
Spare et al.

(10) Patent No.: US 10,923,776 B2
(45) Date of Patent: Feb. 16, 2021

(54) SYSTEMS AND METHODS FOR MONITORING AND RESPONDING TO FORCES INFLUENCING A BATTERY

(75) Inventors: Bradley L. Spare, Oceanside, CA (US); Robert Sean Murphy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1055 days.

(21) Appl. No.: 12/625,143

(22) Filed: Nov. 24, 2009

(65) Prior Publication Data

US 2010/0068607 A1    Mar. 18, 2010

Related U.S. Application Data

(63) Continuation-in-part of application No. 12/242,898, filed on Sep. 30, 2008.

(60) Provisional application No. 61/009,648, filed on Dec. 31, 2007.

(51) Int. Cl.
*H01M 10/48* (2006.01)
*H01M 6/42* (2006.01)

(52) U.S. Cl.
CPC .............. *H01M 10/48* (2013.01); *H01M 6/42* (2013.01)

(58) Field of Classification Search
CPC .......... H01M 10/48; H01M 6/42; H01M 2/00; H01M 2010/4278
USPC .................................................. 429/176, 178
See application file for complete search history.

(56) References Cited

U.S. PATENT DOCUMENTS

| | | | |
|---|---|---|---|
| 5,557,188 A * | 9/1996 | Piercey | 320/134 |
| 6,291,568 B1 | 9/2001 | Lussey | |
| 6,646,540 B1 * | 11/2003 | Lussey | 338/47 |
| 2002/0146621 A1 * | 10/2002 | Yageta et al. | 429/181 |
| 2006/0051892 A1 * | 3/2006 | Bolken et al. | 438/106 |
| 2006/0093896 A1 * | 5/2006 | Hong et al. | 429/61 |
| 2006/0170396 A1 * | 8/2006 | Ha et al. | 320/116 |
| 2007/0024236 A1 * | 2/2007 | Arakelian | H01M 2/1072 320/107 |
| 2007/0054157 A1 * | 3/2007 | Ryu et al. | 429/7 |
| 2007/0105010 A1 * | 5/2007 | Cassidy | A61M 5/44 429/90 |
| 2007/0207379 A1 * | 9/2007 | Hatta et al. | 429/176 |
| 2008/0090134 A1 | 4/2008 | Berg | |

(Continued)

FOREIGN PATENT DOCUMENTS

EP         1050054 B1    3/2007
WO    WO2006-077519    *    7/2006

*Primary Examiner* — Stephen J Yanchuk
(74) *Attorney, Agent, or Firm* — Kilpatrick Townsend & Stockton LLP (57) ABSTRACT

Systems and methods for monitoring and responding to forces influencing batteries of electronic devices are provided. One or more sensors may be provided at various positions within a battery assembly including one or more battery cells within an enclosure. In some embodiments, a sensor may be provided between a battery cell and a portion of the enclosure. In other embodiments, a sensor may be positioned between two adjacent cells in a stack. Each sensor may detect a force influencing a battery cell of the assembly. In some embodiments, the sensor may be a force sensing material having a conductance configured to vary based on the influencing force. In other embodiments, the sensor may be a contact sensor that detects when the influencing force moves two elements together.

20 Claims, 8 Drawing Sheets

(56) References Cited

U.S. PATENT DOCUMENTS

2008/0097704 A1* 4/2008 Notten ............... H01M 10/425
702/42
2009/0169977 A1 7/2009 Sfarzo et al.

* cited by examiner

SYSTEMS AND METHODS FOR MONITORING AND RESPONDING TO FORCES INFLUENCING A BATTERY

CROSS-REFERENCE TO RELATED APPLICATIONS

This application is a continuation-in-part of U.S. Nonprovisional patent application Ser. No. 12/242,898, filed Sep. 30, 2008, which claims the benefit of U.S. Provisional Patent Application No. 61/009,648, filed Dec. 31, 2007, each of which is hereby incorporated by reference herein in its entirety.

FIELD OF THE INVENTION

This relates to systems and methods for monitoring and responding to forces influencing a battery.

BACKGROUND OF THE DISCLOSURE

Pressure can build up within a battery as the battery operates, for example, due to heat. Pressure can also be applied to an external portion of a battery, such as by a physically adjacent object. These pressures generate forces that influence effects of the battery, such as the size and shape of the battery. Although some magnitudes of such forces can be normal, more intense forces may be indicative of an impending battery failure. Accordingly, what is needed are systems and methods for monitoring and responding to forces influencing a battery.

SUMMARY OF THE DISCLOSURE

Systems and methods for monitoring and responding to forces influencing a battery are provided.

According to one embodiment of the invention, an electronic device is provided that includes a battery and a battery force sensor. The battery force sensor may include force sensing material having a conductance that is configured to vary based on at least one force influencing the battery. The battery force sensor may also include force sensing circuitry coupled to the force sensing material. The force sensing circuitry may be configured to produce a force output signal based on the conductance of the force sensing material.

According to another embodiment of the invention, a method is provided for monitoring a battery. The method may include varying the conductance of a material based on at least one force influencing the battery, and producing a force output signal based on the conductance of the material.

According to yet another embodiment of the invention, there is provided a battery force sensor for use with a battery. The battery force sensor may include force sensing material having a conductance that is configured to vary based on a force influencing the battery. The battery force sensor may also include force sensing circuitry coupled to the force sensing material, wherein the force sensing circuitry is configured to produce a force output signal based on the conductance of the force sensing material.

According to yet still another embodiment of the invention, there is provided a battery assembly including an enclosure, a first battery cell positioned within the enclosure, and a first sensor positioned within the enclosure for detecting at least one force influencing the first battery cell. An adhesive layer may be positioned between the first battery cell and the enclosure, and the first sensor may also be positioned between the first battery cell and the enclosure. Alternatively, the first sensor may be positioned between the first battery cell and a second battery cell stacked on top of the first battery cell, and an adhesive may also be positioned between the first battery cell and the second battery cell. A second sensor may be positioned between the second battery cell and a third battery cell stacked on top of the second battery cell.

According to yet still another embodiment of the invention, there is provided a method for monitoring a battery having a first cell and a second cell stacked within an enclosure. The method may include positioning a first sensor material between the first cell and the second cell or positioning the first sensor material between the first cell and the enclosure. The method may also include varying the conductance of the first material based on at least one force influencing the first cell, and producing a first force output signal based on the conductance of the first material. The method may also include controlling a facility of the first cell based on the force output signal.

BRIEF DESCRIPTION OF THE DRAWINGS

The above and other features of the invention, its nature, and various advantages will become more apparent upon consideration of the following detailed description, taken in conjunction with the accompanying drawings, in which like reference characters refer to like parts throughout.

DETAILED DESCRIPTION OF THE DISCLOSURE

A battery of an electronic device (e.g., a portable media player or cellular telephone) may be tightly and/or deeply packaged into the device when the device is assembled. Therefore, periodic physical inspection of the battery may be difficult or impractical once the device is assembled. Moreover, the influence of one or more forces on a battery may physically impact and damage another component of the device and/or damage the battery itself.

The systems and methods of the invention may provide for monitoring and responding to forces influencing a battery. In some embodiments, the systems and methods of the invention may sense a force influencing a battery prior to the battery impacting another component of the electronic device. In some embodiments, the systems and methods of the invention may sense the battery impacting another component and may sense a force influencing the battery before, during, and/or after the impact.

In view of the foregoing, systems and methods for monitoring and responding to forces influencing a battery are provided and described with reference to FIGS. 1-9.

Figure 1:
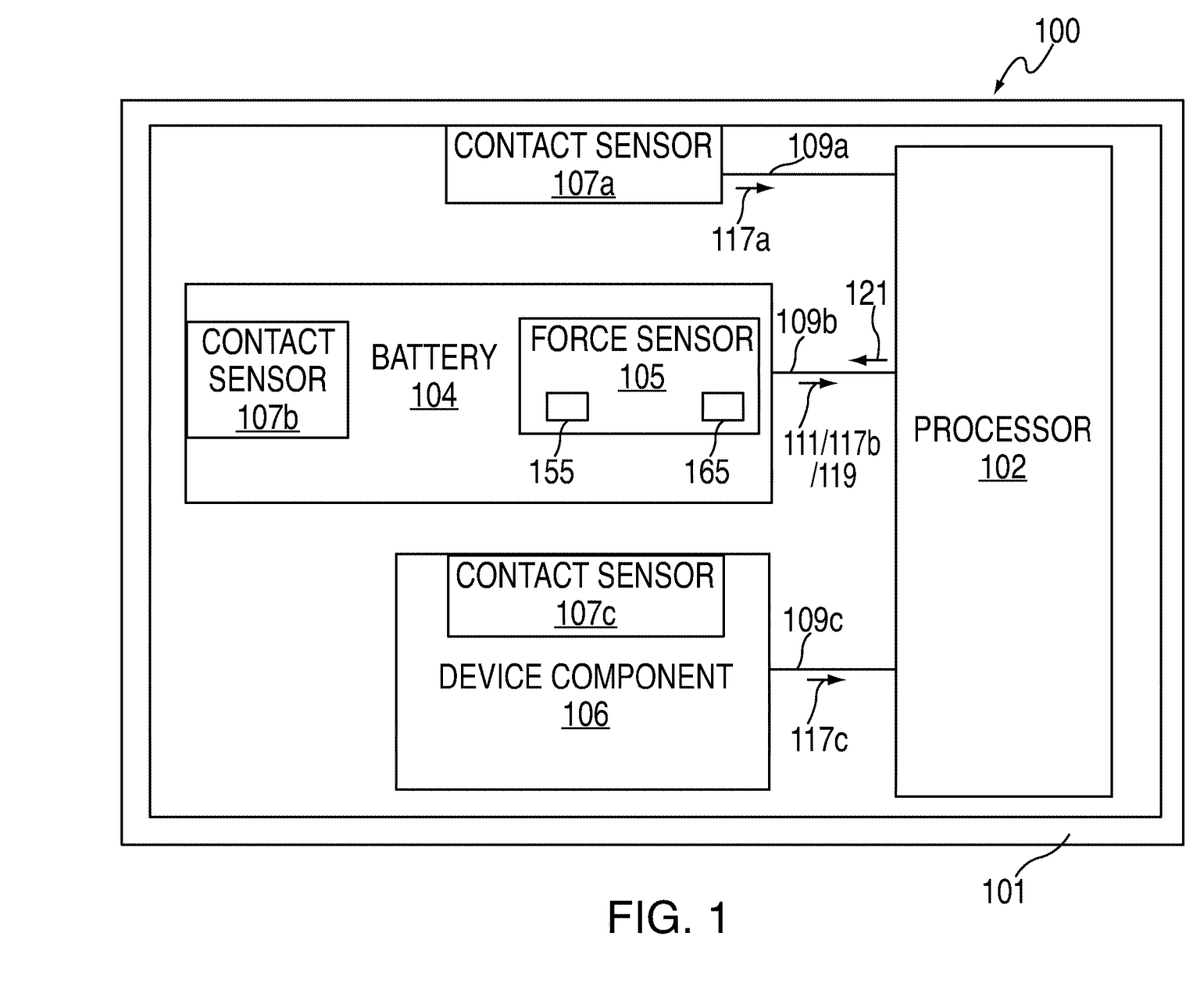
FIG. 1 shows a simplified block diagram of an electronic device with a battery and a battery force sensor, according to some embodiments of the invention.

FIG. 1 shows an electronic device 100 including a battery force sensor in accordance with some embodiments of the invention. The term "electronic device" can include, but is not limited to, music players, video players, still image players, game players, other media players, music recorders, video recorders, cameras, other media recorders, radios, medical equipment, domestic appliances, transportation vehicle instruments, calculators, cellular telephones, other wireless communication devices, personal digital assistants, programmable remote controls, pagers, laptop computers, desktop computers, printers, and combinations thereof. In some cases, the electronic device may perform a single function (e.g., a device dedicated to playing music) and, in other cases, the electronic device may perform multiple functions (e.g., a device that plays music, displays video, stores pictures, and receives and transmits telephone calls).

Moreover, in some cases, the electronic device may be any portable, mobile, hand-held, or miniature electronic device having a battery force sensor constructed according to the invention that allows a user to use the device wherever the user travels. Alternatively, an electronic device that incorporates a battery force sensor of the invention may not be portable at all, but may instead be generally stationary, such as a desktop computer or television.

Figures 2, 3:
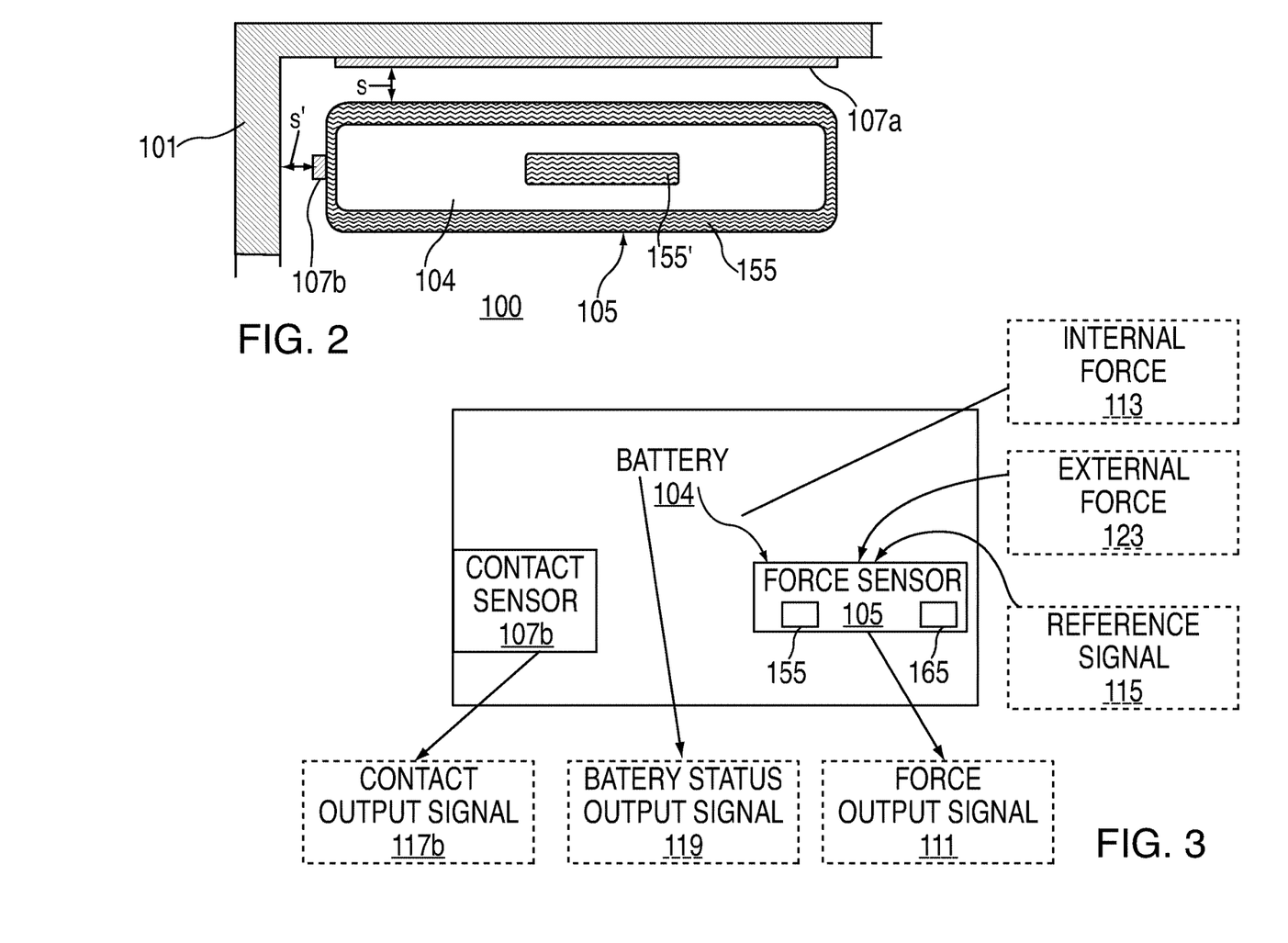
FIG. 2 shows a simplified sectional view of a portion of the electronic device with the battery and the battery force sensor of FIG. 1, according to some embodiments of the invention.
FIG. 3 shows a simplified block diagram of the battery and the battery force sensor of FIGS. 1 and 2, according to some embodiments of the invention.

As shown in FIGS. 1-3, electronic device 100 may include a housing 101, a processor 102, a battery 104 having at least one battery force sensor 105, one or more additional device components 106, and one or more contact sensors 107. One or more wired or wireless links 109 may also be provided in order for processor 102 to transmit information to and/or to receive information from at least one of the other components and sensors of device 100.

Additional device component 106 may be any type of device component, including, but not limited to, an input component that can permit a user to interact or interface with device 100, an output component that can present information (e.g., textual, graphical, audible, and/or tactile information) to a user of device 100, a communications component that can allow device 100 to communicate with one or more other electronic devices using any suitable communications protocol, a memory component that can include one or more storage mediums (e.g., a hard-drive, flash memory, permanent memory such as read only memory ("ROM"), semi-permanent memory such as random access memory ("RAM"), or any other suitable type of storage component), or an additional power supply component that can provide power to one or more of the other components or sensors of device 100.

Processor 102 of device 100 may control the operation of many functions and other components of the device. In some embodiments, processor 102 may include a system management controller ("SMC"). For example, processor 102 can receive input signals from an input component and/or drive output signals through an output component. Processor 102 may load a user interface program (e.g., a program stored in a memory component of the device or a program stored on another device or server) to determine how instructions received via an input component of the device may manipulate the way in which information (e.g., information stored in a memory component of the device or a program stored on another device or server) is provided to the user via an output component of the device.

Housing 101 may at least partially enclose one or more of the components of device 100 for protecting them from debris and other degrading forces external to the device. In some embodiments, one or more of the components may be provided within its own housing (e.g., device component 106 may be an independent keyboard or mouse input component within its own housing that may wirelessly or through a wire (e.g., via link 109c) communicate with processor 102, which may be provided within its own housing).

Battery 104 may be any suitable type of battery for at least partially powering one or more components or sensors of device 100. For example, battery 104 may be a lithium battery or "lithium cell" or any other type of on board power supply containing, for example, a lithium ion material and/or a lithium polymer material. In other embodiments, battery 104 may not be lithium based, but may include nickel-cadmium or any other suitable material or materials, for example. Battery 104 may be a single cell or may include a plurality of cells. Battery 104 may also include one or more battery force sensors 105 according to the invention.

As shown in FIG. 3, each force sensor 105 may be configured to detect the magnitude of one or more various forces that may influence battery 104, such as forces that may produce a change in the movement, size, shape, or other effects of battery 104. For example, force sensor 105 may be configured to detect the magnitude of one or more internal forces 113 generated by conditions internal to battery 104, such as internal pressure that may build up within the battery (e.g., due to latent cell or pack manufacturing or assembly defects, improper charging or discharging conditions, heat, etc.) and cause the battery to expand (e.g., beyond expected limits). Additionally or alternatively, force sensor 105 may be configured to detect the magnitude of one or more external forces 123 generated by conditions at least partially external to battery 104, such as external contact that may be applied to an external surface of the battery when the battery physically contacts a remote object (e.g., a housing wall of the electronic device due to assembly tolerance defects or from external deformation crush pressure beyond system design, etc.). It is to be noted that the term "force" can include, without limitation, force per unit area (i.e., pressure).

Based on the one or more detected forces, force sensor 105 may be configured to produce one or more force output signals 111. Therefore, each force output signal 111 may be responsive to a detected swelling, expansion, contraction, deformation, bulge, and/or any other type of change in the size, shape, or any other effect of battery 104, whether a result of one or more forces internal to battery 104, one or more forces external to battery 104, or a combination thereof. Force output signals 111 may be communicated to a processing component (e.g., to processor 102 via link 109b or to processing circuitry located within force sensor 105 (not shown)). Such a processing component may evaluate one or more force output signals 111 of force sensor 105 in order to appropriately determine a state or condition of battery 104 and, thus, to appropriately control the operation of electronic device 100. The processing component may also be configured to calibrate the force output signals and each force sensor (e.g., with respect to initial battery cell and pack conditions).

Each force sensor 105 may include force sensing material 155 and force sensing circuitry 165. Force sensing material 155 may be any suitable material that can change its conductance based upon pressures or forces being applied to the material (e.g., internal forces 113 and/or external forces 123). Force sensing circuitry 165 may be any suitable circuitry for adequately detecting the electrical conductance of force sensing material 155 at any given moment. In some embodiments, at least one reference signal (e.g., reference signal 115 of FIG. 3, which, for example, may be a substantially constant voltage) may be provided to force sensor 105. Force output signal 111 may be a result of force sensing circuitry 165 applying reference signal 115 to force sensing material 155 and detecting the magnitude of reference signal 115 conducted by force sensing material 155. Thus, as the electrical conductance of force sensing material 155 changes, so may change the magnitude of reference signal 115 detected by force sensing circuitry 165 across force sensing material 155, and so may change force output signal 111.

Force sensing material 155 may include at least one variable electrical conductor. The variable electrical conductor may be configured to have various levels of electrical conductance based on the amount of mechanical stress or pressure being applied to the conductor. For example, the conductor may be configured to have a first level of electrical conductance when in a first physical configuration (e.g., when quiescent or in an original unstressed state), and the conductor may be configured to have a second level of electrical conductance that is greater than or less than the first level when the conductor is in a second physical configuration (e.g., when a certain mechanical stress is applied to the conductor).

In some embodiments, force sensing material 155 may be at least partially made of or otherwise include one or more various types of quantum tunneling composites ("QTCs"), as made available by Peratech Ltd. of Darlington, England, for example. QTCs may be composite materials of metals and non-conducting elastomeric binders. That is, in some embodiments, force sensing material 155 may be a polymer composition, such as an elastomeric conductive polymer composition, that may display a relatively large dynamic resistance range and isotropic electrical properties when subjected to distortion forces, such as compression or extension forces or alignments created by mechanical energy, thermal energy, electric fields, or magnetic fields. These and other suitable types of materials that may be used to provide force sensing material 155 of force sensor 105 are described in further detail, for example, in Lussey U.S. Pat. No. 6,291,568, Lussey U.S. Pat. No. 6,646,540, and Lussey et al. European Patent No. EPO 1 050 054, each of which is hereby incorporated by reference herein in its entirety.

Although force sensing material 155 is shown in FIG. 2 to be coupled about the exterior of battery 104, some or all of force sensing material 155 may be coupled to battery 104 in any suitable manner, such as within an internal portion of battery 104 (see, e.g., force sensing material 155' of FIG. 2). For example, one or more portions of force sensing material 155 of force sensor 105 may be provided as one or more sheets, layers, deposits, wraps, granules, or any and all other forms that may be inked into, disposed onto, incorporated within, or otherwise coupled to one or more portions of battery 104, including disposing at least a portion of the force sensing material between elements of the battery (e.g., disposing at least a portion of the force sensing material between two cells in the battery). In some embodiments, force sensor 105 may act as a force sensing resistor and may include a pressure sensitive ink disposed on a carrier (e.g., a flexible substrate or any suitable portion of battery 104, such as a covering or cell layer). For example, force sensor 105 may include one or more FlexiForce™ force sensors, as made available by Tekscan, Inc. of South Boston, Mass. Additionally or alternatively, force sensor 105 may include any suitable type of switch that may detect forces above at least one particular threshold, such as one or more polymer membrane binary switches that may have a trigger force tunable by a stack up design, one or more discrete dome switches that may be positioned on a polymer substrate, or any other suitable force sensing trigger switch.

Figure 7A:
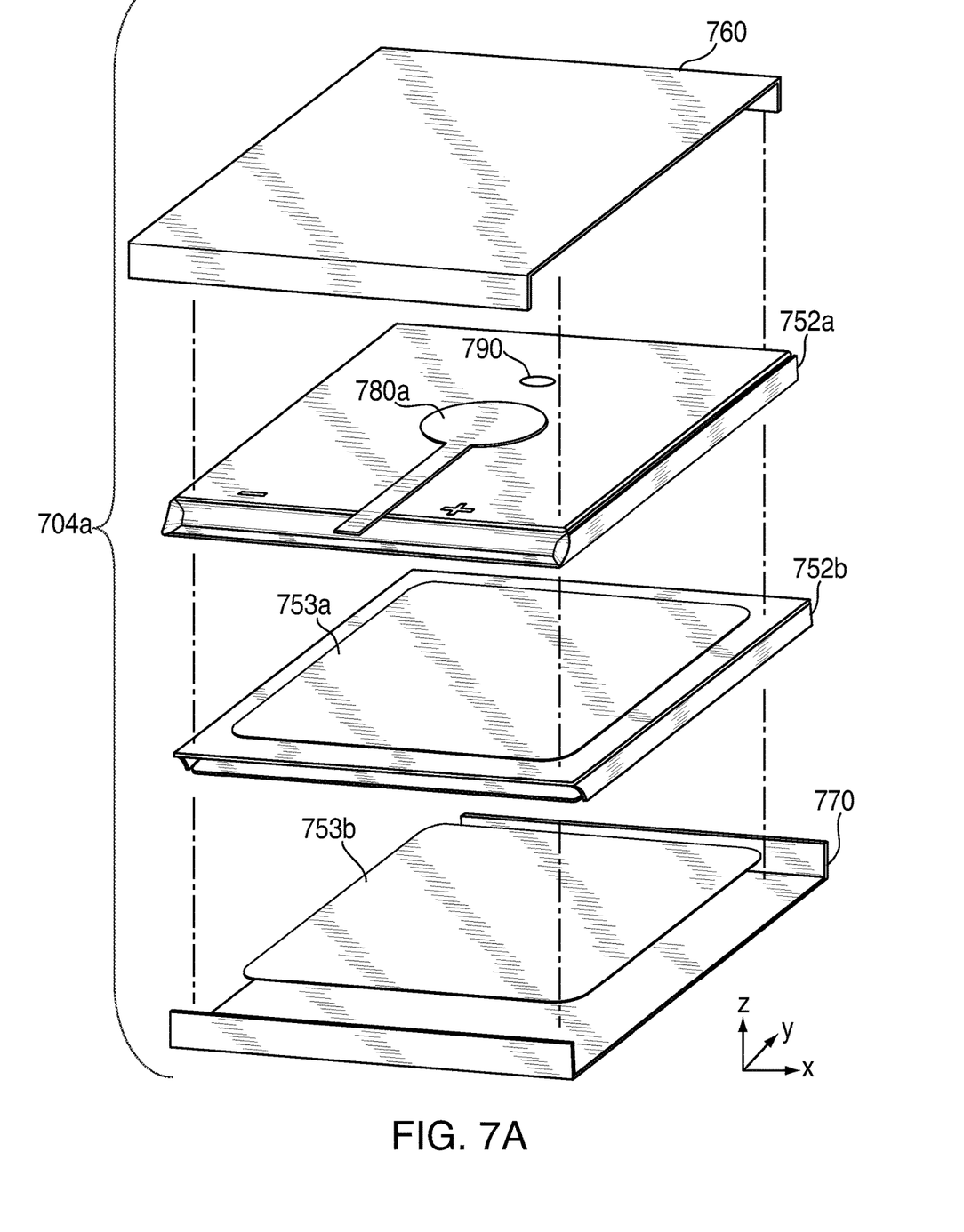
FIGS. 7A-7C show exploded perspective views of battery assemblies including sensors, according to various embodiments of the invention.
Figure 7B:
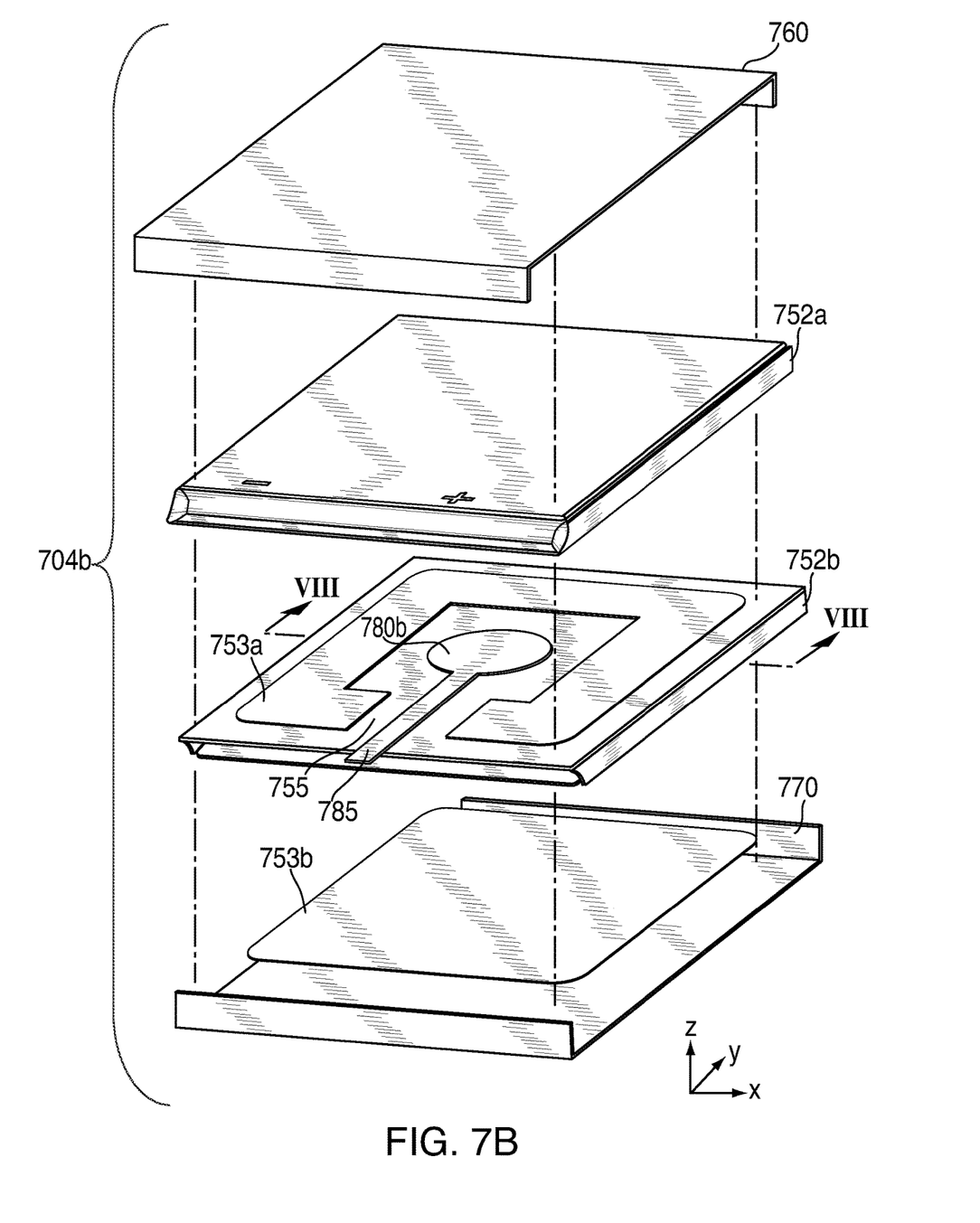
Figure 7C:
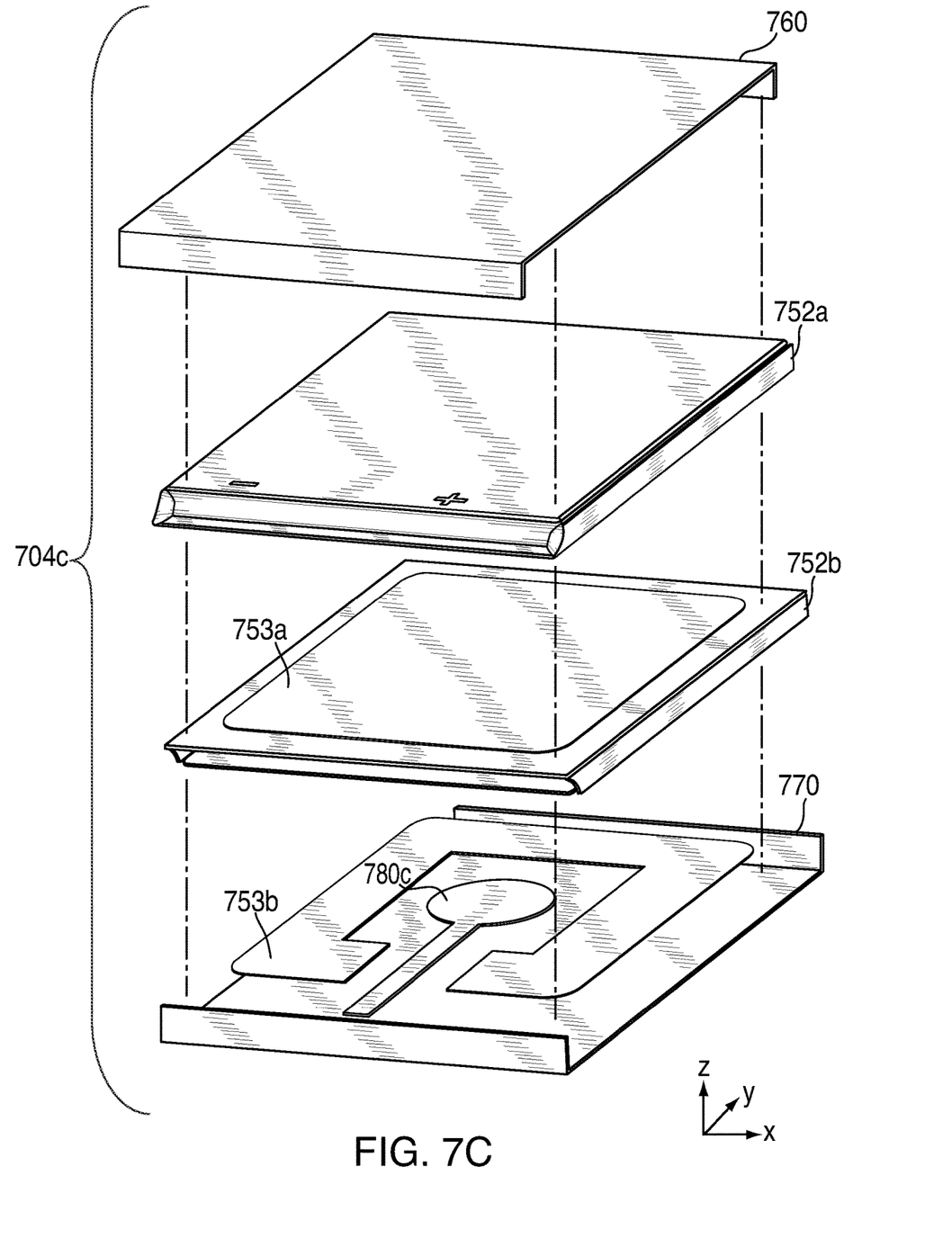

As shown in FIGS. 7A-7C, for example, one or more sensors may be provided at various positions within a battery assembly. FIGS. 7A-7C show exploded views of a respective illustrative battery assembly 704a-704c, each of which, in some embodiments, may be substantially similar to battery 104 of FIGS. 1-5C. Each battery assembly 704 may include one or more battery cells 752 (e.g., cell 752a and cell 752b). Cells 752 may be arranged in any suitable array, including one stack or two or more adjacent stacks of cells. For example, as shown in FIGS. 7A-7C, cells 752 may be stacked on top of one another in a single stack (e.g., in the Z-direction) and may be positioned between a top enclosure 760 and a bottom enclosure 770. In other embodiments, a battery assembly 704 may only include a single cell 752 positioned between top enclosure 760 and bottom enclosure 770.

In some embodiments, top enclosure 760 and bottom enclosure 770 may each be made of the same material and may combine to form a protective case, which may surround some or all sides of the one or more stacks of one or more battery cells 752 of battery assembly 704. For example, top enclosure 760 and bottom enclosure 770 may each be plastic or any other suitable material for holding the one or more battery cells 752. In some embodiments, top enclosure 760 and bottom enclosure 770 may be a single unitary enclosure component. In other embodiments, bottom enclosure 770 may be a plastic case and top enclosure 760 may be any suitable protective foil or film, such as biaxially-oriented polyethylene terephthalate ("boPET") polyester film (e.g., a Mylar™ covering), which may hold each of the one or more cells 752 within bottom enclosure 770. In some embodiments, bottom enclosure 770 may be provided by another component of an electronic device in which battery assembly 704 is positioned. For example, bottom enclosure 770 may be provided by a wall of an electronic device housing (e.g., housing 101 of FIGS. 1 and 2) or by a portion of an electronic device component (e.g., device component 106 of FIG. 1). In such embodiments, top enclosure 760 may hold the cell(s) 752 against bottom enclosure 770.

In some embodiments, an adhesive layer 753 may be provided between two or more portions of battery assembly 704 for maintaining the relative position of those portions.

For example, an adhesive layer 753*a* may be provided between two stacked battery cells 752 (e.g., between cell 752*a* and cell 752*b*). Additionally or alternatively, an adhesive layer 753*b* may be provided between a battery cell 752 and an enclosure portion (e.g., between cell 752*b* and bottom enclosure 770). Each adhesive layer 753 may be any suitable material, including double-sided sticky tape (e.g., VHB™ tape).

In some embodiments, one or more sensors may be provided between top enclosure 760 and a cell 752 of battery assembly 704. For example, as shown in FIG. 7A, a sensor 780*a* may be positioned between top enclosure 760 and battery cell 752*a* of battery assembly 704*a*. Battery cell 752*a* may be the only battery cell in battery assembly 704*a*, or battery cell 752*a* may be the top cell 752 in a stack of two or more cells 752 including cell 752*b*, for example. Sensor 780*a* may be any sensor described with respect to FIGS. 1-6, such as a contact sensor 107 or a force sensor 105 that may include a force sensing material 155. In some embodiments, a swell air space may be provided between top enclosure 760 and battery cell 752*a*, and sensor 780*a* may be positioned in that space. For example, at least one deformable element 790 (e.g., a foam pad) may be positioned adjacent sensor 780*a* between top enclosure 760 and battery cell 752*a* to provide an initial spacing between top enclosure 760 and battery cell 752*a*.

However, in some embodiments, top enclosure 760 may include a portion that is too soft, deflective, or otherwise unable to provide a solid surface that may allow a force to be detected by sensor 780*a* positioned between top enclosure 760 and battery cell 752*a*. Therefore, in some embodiments, one or more sensors 780 may be provided between two stacked battery cells of battery assembly 704. For example, as shown in FIG. 7B, a sensor 780*b* may be positioned between battery cell 752*a* and battery cell 752*b* of battery assembly 704*b*. Sensor 780*b* may be any sensor described with respect to FIGS. 1-7A, such as force sensing material 155 of a force sensor 105 or a contact sensor 107. If battery assembly 704*b* includes three or more stacked cells 752, a sensor 780 may be positioned between each set of adjacent cells 752 in the stack.

Figure 8:
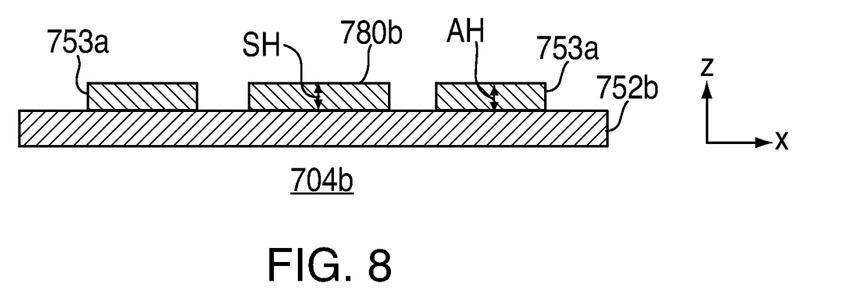
FIG. 8 is a horizontal cross-sectional view of a portion of the battery assembly of FIG. 7B, taken from line VIII-VIII of FIG. 7B, according to some embodiments of the invention.
Figure 9:
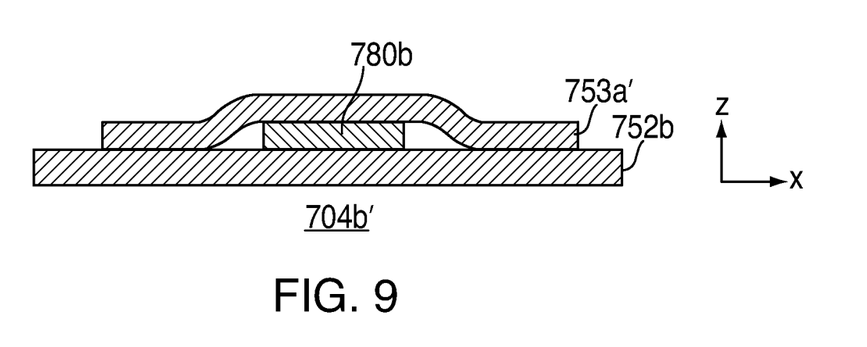
FIG. 9 is a horizontal cross-sectional view of a portion of a battery assembly, similar to FIG. 8, according to other embodiments of the invention.

As shown in FIG. 7B, adhesive layer 753*a* may also be provided between battery cell 752*a* and battery cell 752*b* of battery assembly 704*b*. As opposed to adhesive layer 753*a* of battery assembly 704*a* of FIG. 7A, which may be shaped substantially similarly to the shapes of the opposing faces of adjacent battery cells 752*a* and 752*b*, adhesive layer 753*a* of battery assembly 704*b* of FIGS. 7B and 8 may be positioned adjacent sensor 780*b* and may be shaped to surround at least a portion of sensor 780*b* around its perimeter (e.g., in an X-Y plane positioned between cells 752*a* and 752*b*). Therefore, in some embodiments, adhesive layer 753*a* may not be positioned between at least a portion of sensor 780*b* and at least a portion of cell 752*a* and/or cell 752*b*. As shown in FIG. 7B, a gap 755 may be provided in adhesive layer 753*a* for allowing a portion of sensor 780*b* to extend towards an edge of battery assembly 704*b*. For example, gap 755 may allow a sensor extension 785 to extend from sensor 780*b* towards an edge of battery assembly 704*b*. Sensor extension 785 may couple sensor 780*b* to force sensing circuitry (e.g., force sensing circuitry 165) of sensor 780*b* or to any other component of the device in which battery assembly 704*b* is positioned. Alternatively, as shown in FIG. 9, adhesive layer 753*a*' may overlap sensor 780*b*, and at least a portion of adhesive layer 753*a*' may be positioned between at least a portion of sensor 780*b* and at least a portion of cell 752*a* and/or cell 752*b* of a battery assembly 704*b*'. As shown in FIG. 8, adhesive layer 753*a* may have a height AH and sensor 780*b* may have a height SH in the Z-direction between cell 752*a* and cell 752*b* (not shown in FIG. 8). In some embodiments, adhesive height AH may be substantially equal to or larger than sensor height SH, which may prevent a localized pressure from being exerted just on sensor 780*b*.

In yet other embodiments, one or more sensors may be provided between a cell 752 and bottom enclosure 770 of a battery assembly 704. For example, as shown in FIG. 7C, a sensor 780*c* may be positioned between battery cell 752*b* and bottom enclosure 770 of battery assembly 704*c*. Battery cell 752*b* may be the only battery cell in battery assembly 704*c*, or battery cell 752*b* may be the bottom cell 752 in a stack of two or more cells 752 including cell 752*a*, for example. Sensor 780*c* may be any sensor described with respect to FIGS. 1-7B, such as force sensing material 155 of a force sensor 105 or a contact sensor 107. Similarly to adhesive layer 753*a* of battery assembly 704*b* FIGS. 7B and 8, adhesive layer 753*b* of battery assembly 704*c* of FIG. 7C may be positioned adjacent sensor 780*c* and may be shaped to surround at least a portion of sensor 780*c* around its perimeter (e.g., in an X-Y plane positioned between cell 752*b* and bottom enclosure 770). Therefore, adhesive layer 753*b* may not be positioned between at least a portion of sensor 780*c* and at least a portion of cell 752*b* and/or bottom enclosure 770. Alternatively, adhesive layer 753*b* of battery assembly 704*c* may overlap sensor 780*c*, and at least a portion of adhesive layer 753*b* may be positioned between at least a portion of sensor 780*c* and at least a portion of cell 752*b* and/or bottom enclosure 770.

In some embodiments, battery 104 may be protected with a foil and covered in a protective material (e.g., a Mylar covering). Force sensing material 155 of force sensor 105 can be on the order of only 50 microns to 100 microns thick, for example, and may be printed into the covering of the battery. Therefore, force sensors of this invention can be used with existing battery assemblies without substantially altering the dimensions of the assemblies, and, therefore, force sensors of this invention are manufacturing flexible and do not prevent the production of considerably thin batteries. A change in the magnitude of at least one force that influences battery 104 (e.g., an internal force 113 and/or an external force 123) may be detected by such manufacturing flexible sensing material 155 of force sensor 105, and, in turn, force sensor 105 may react to the one or more detected forces by producing and/or altering one or more force output signals 111.

Figure 4A:
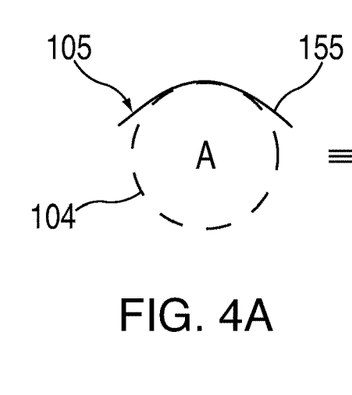
FIGS. 4A and 4B show a series of simplified sectional views of the battery and the battery force sensor of FIGS. 1-3, at various states, according to some embodiments of the invention.
Figure 4B:
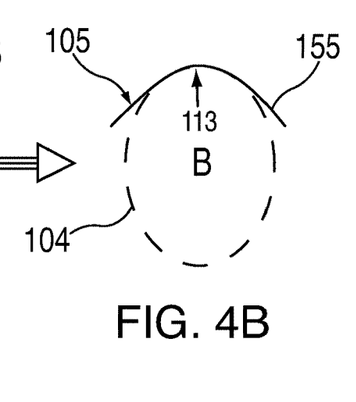

As shown in FIGS. 4A and 4B, for example, at least a portion of force sensing material 155 of force sensor 105 may be coupled to at least a portion of battery 104. Battery 104 labeled with an "A" (see, e.g., FIG. 4A) may represent battery 104 at a time A when battery 104 is in a first state A (e.g., when battery 104 is configured in its original geometrical size and shape). In this state A, no forces may be influencing battery 104 and, therefore, force sensor 105 may not be detecting any internal forces 113 or any external forces 123. Although, in other embodiments, it is to be understood that battery 104 in its first state A may be influenced by various forces.

Battery 104 labeled with a "B" (see, e.g., FIG. 4B) may represent battery 104 at some later time (e.g., at a time B) when battery 104 is in a new state (e.g., a second state "B"). When in state B, the movement, geometrical size, shape, and/or any other effect of battery 104 may be changed due to an influence of an internal force 113. This new internal force 113 may stretch or otherwise exert a force upon force sensing material 155 of force sensor 105, as depicted by a change in the length and a change in the curvature of force sensing material 155 in FIG. 4B, such that the internal force 113 may be detected by force sensor 105.

Figure 4C:
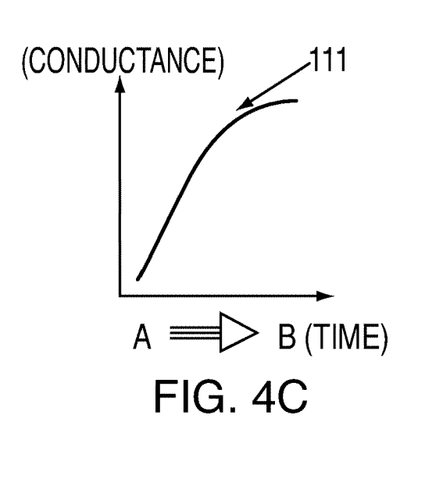
FIG. 4C shows a graph of a force output signal of the battery force sensor of FIGS. 1-4B, at the various states of FIGS. 4A and 4B, according to some embodiments of the invention.

As shown in FIG. 4C, a graph may depict a force output signal 111 provided by force sensor 105 from time A to time B, corresponding to the increase in internal force 113 influencing battery 104, as shown in FIGS. 4A and 4B. Without limitation, force output signal 111 may be a continuous and substantially monotonic function of internal force 113. Although FIGS. 4A-4C show battery 104 and, thus, internal force 113 increasing over time, it is to be appreciated that the magnitude of internal force 113 and its influential effect on battery 104 may each increase, decrease, or alternately increase and decrease over time. Furthermore, although FIG. 4C shows force output signal 111 increasing as internal force 113 increases, it is to be appreciated that some embodiments may provide a force output signal 111 that increases as internal force 113 decreases, or vice versa. In any case, detected changes to internal force 113 may correlate in some way with changes to force output signal 111.

Figures 5A, 5B:
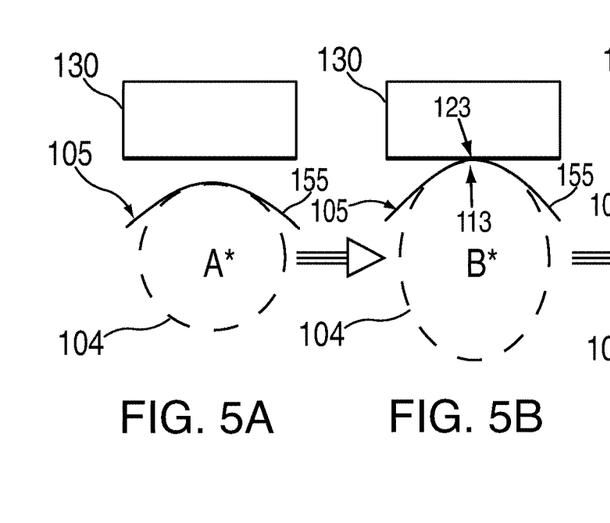
FIGS. 5A-5C show a series of simplified sectional views of the battery and the battery force sensor of FIGS. 1-4B and a remote object, at various states, according to some embodiments of the invention.
Figures 5C, 5D:
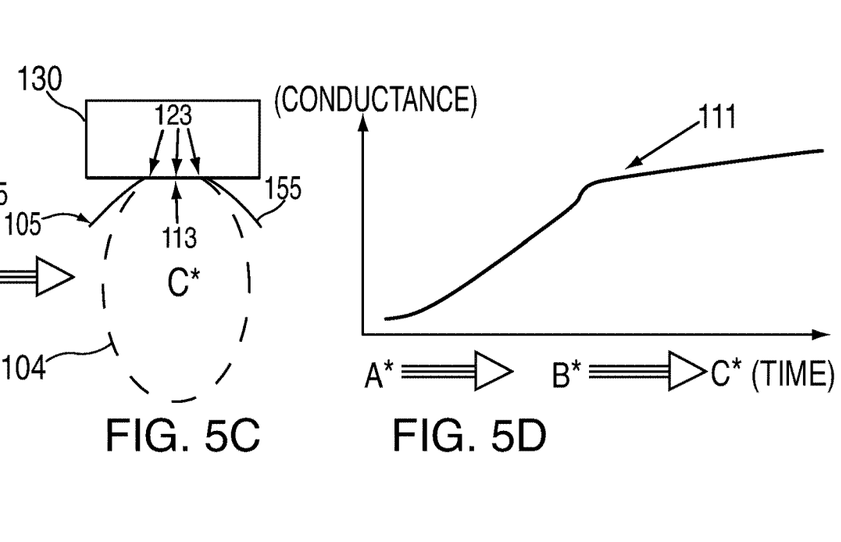
FIG. 5D shows a graph of a force output signal of the battery force sensor of FIGS. 1-4B and 5A-5C, at the various states of FIGS. 5A-5C, according to some embodiments of the invention.

As shown in FIGS. 5A-5C, for example, battery 104 may impact and/or may be impacted by a remote object 130 such that battery 104 physically contacts remote object 130. This physical contact may generate an external force 123 that influences battery 104, for example, by producing a change in the movement, size, shape, and/or one or more other effects of battery 104. Remote object 130 may be any device component (e.g., device component 106), sensor (e.g., contact sensors 107a-107c), housing (e.g., housing 101), or any other physical element that is independent of battery 104.

Battery 104 labeled with an "A*" (see, e.g., FIG. 5A) may represent battery 104 at a time A* when battery 104 is in a first state A* (e.g., when battery 104 is configured in an original geometrical size and shape). In this state A*, no forces may be influencing battery 104 and, therefore, force sensor 105 may not be detecting any internal forces 113 or any external forces 123. Although, in other embodiments, it is to be understood that battery 104 in its first state A* may be influenced by various forces.

Battery 104 labeled with a "B*" (see, e.g., FIG. 5B) may represent battery 104 at some time later (e.g., at a time B*) when battery 104 is in a new state (e.g., a second state "B*"). When in state B*, the movement, geometrical size, shape, and/or any other effect of battery 104 may be changed due to an influence of an internal force 113. This new internal force 113 may stretch or otherwise exert a force upon force sensing material 155 of force sensor 105, as depicted by a change in the length and a change in the curvature of force sensing material 155 in FIG. 5B, such that the internal force 113 may be detected by force sensor 105.

In some embodiments, new internal force 113 may expand battery 104 such that it impacts remote object 130. For example, as shown in FIG. 5B, battery 104 may physically contact remote object 130. When battery 104 initially contacts remote object 130, an additional force (e.g., initial external force 123 of FIG. 5B) may be generated. This external force 123 may influence battery 104 and, thus, may be detected by force sensor 105. It is to be noted that, alternatively or in addition to an internal force 113 expanding battery 105 such that battery 105 may impact remote object 130, remote object 130 may itself be expanded or physically moved in some way such that it impacts battery 104. For example, remote object 130 may be a component coupled to a housing 101 of device 100 (see, e.g., sensor 107a of FIGS. 1 and 2), such that if a user sits on electronic device 100, housing 101 may deflect, thereby causing remote object 130 coupled to the housing to move towards and impact battery 104.

Battery 104 labeled with a "C*" (see, e.g., FIG. 5C) may represent battery 104 at some time even later (e.g., at a time C*) when battery 104 is in a new state (e.g., a third state "C*"). When in state C*, the movement, geometrical size, shape, and/or any other effect of battery 104 may be further changed due to an increased influence of internal force 113, and/or the magnitude of impact between battery 104 and remote object 130 may be further changed due to an increased influence of external force 123. Although FIG. 5C shows an increased external force 123 as an increased area of impact between larger portions of battery 104 and remote object 130 as compared to that at time B* of FIG. 5B, in some embodiments an increased external force 123 may additionally or alternatively include an increased pressure between specific portions of battery 104 and remote object 130.

At the moment physical contact between battery 104 and remote object 130 occurs, force output signal 111 generated by force sensor 105 may cease being entirely based on internal force 113, and may instead be based on both internal force 113 and external force 123. Force output signal 111 may capture the initial external force 123 caused by the initial physical contact (e.g., at time B*) and any subsequent increases in external force 123 (e.g., at time C*) or any subsequent decreases in the forces (not shown).

As shown in FIG. 5D, a graph may depict a force output signal 111 provided by force sensor 105 from time A* to time C*, corresponding to the increase in internal force 113 influencing battery 104 and to the increase in external force 123 influencing battery 104, as shown in FIGS. 5A-5C. Force output signal 111 may include two modes, one mode from time A* to time B* as new internal force 113 is increasing without new external force 123, and the other mode from time B* to time C* as new external force 123 is also present.

Although FIGS. 5A-5D show battery 104 and, thus, internal force 113 and external force 123 increasing over time, it is to be appreciated that the magnitude of internal force 113 and its influential effect on battery 104, as well as the magnitude of external force 123 and its influential effect on battery 104, may each increase, decrease, or alternately increase and decrease over time. Furthermore, although FIG. 5D shows force output signal 111 increasing as internal force 113 and external force 123 increase, it is to be appreciated that some embodiments may provide a force output signal 111 that increases as internal force 113 and/or external force 123 decreases, or vice versa. In any case, detected changes to internal force 113 and/or external force 123 may each correlate in some way with changes to force output signal 111.

Although force sensing material 155 of force sensor 105 of FIGS. 5A-5C is shown to be provided along an external surface of battery 104 that physically contacts remote object 130, it is to be understood that force sensing material 155 may be provided as any other portion of battery 104 in accordance with the invention. For example, as mentioned, force sensing material 155 may be disposed within battery 104 between individual cells of the battery. In such embodiments, external force 123 generated by the physical contact of battery 104 with remote object 130 may still be detected by force sensing material 155, even though force sensing material 155 may not be physically contacting remote object 130 itself.

In some embodiments, as shown in FIGS. 1-3, for example, electronic device 100 may also include one or more contact sensors 107 to detect when two elements contact each other. For example, each contact sensor may include two conductive pads (e.g., copper pads) that may generate a signal when they contact each other. For example, a contact sensor 107a may be provided along a portion of an interior wall of housing 101. Contact sensor 107a may generate a first output signal (e.g., contact output signal 117a) that can indicate the existence of physical contact between a remote object and contact sensor 107a, and, thus, housing 101 itself. In some embodiments, contact sensor 107a can be activated when physical contact is made between housing 101 and a remote object (e.g., when the spacing (e.g., spacing s of FIG. 2) between contact sensor 107a and battery 104 has been traversed).

Moreover, as shown, battery 104 may also include a contact sensor 107b. Contact sensor 107b may generate a second output signal (e.g., contact output signal 117b) that can indicate the existence of physical contact between a remote object and contact sensor 107b, and, thus, battery 104 itself. In some embodiments, contact sensor 107b can be activated or otherwise triggered when physical contact is made between battery 104 and a remote object (e.g., when the spacing (e.g., spacing s' of FIG. 2) between contact sensor 107b and a side wall of housing 101 has been traversed). Reference signal 115, battery 104, or any other suitable power source may power contact sensor 107b or any of the other contact sensors of electronic device 100. Furthermore, as shown, device component 106 may also include a contact sensor 107c. Contact sensor 107c may generate a third output signal (e.g., contact output signal 117c) that can indicate the existence of physical contact between a remote object and contact sensor 107c, and, thus, device component 106 itself.

As shown in FIG. 1, for example, processor 102 may be provided with one or more of the following signals:

a contact output signal 117a via link 109a transmitted from contact sensor 107a coupled to the interior surface of a portion of housing 101, a contact output signal 117b via link 109b transmitted from contact sensor 107b provided by battery 104, a contact output signal 117c via link 109c transmitted from a contact sensor 107c provided by device component 106, and a force output signal 111 via link 109b transmitted from force sensor 105 of battery 104. Processor 102 may be adapted to conduct an evaluation of one or more of these received signals and to generate at least one processor output signal 121 that is at least partially in response to the evaluation. Processor output signal 121 may be communicated to at least one of the other components of device 100 (e.g., to battery 104 via link 109b as shown in FIG. 1). Processor output 121 may be one or more signals that can control a facility related to charging or drawing current from battery 104, or that can control any other facility related to any other feature of electronic device 100 and its maintenance, including, but not limited to, a backlight, a hard disk, a CPU, a charger for the battery, an input or output component of the device, a fan or cooling unit, a backup system, a failover system (e.g., a system that may switch over to a backup system), a redundant system, a memory component device, an audible and/or visual alarm, a dialog box, a user interface, and the like. Moreover, reference signal 115 may be provided by processor 102 or any other component of device 100, including battery 104 itself.

As shown in FIG. 1, for example, processor 102 may be provided with yet another signal, such as battery status output signal 119 via link 109b that may be transmitted from battery 104. Battery status output signal 119 may be related to one or more characteristics of battery 104, including, but not limited to, a voltage, a current, a temperature, or the like of battery 104. Processor 102 may be configured to conduct one or more evaluations of battery status output signal 119 as well as of one or more other signals, such as force output signal 111, and to generate one or more processor output signals (e.g., processor output signal 121) in response to the evaluation(s). For example and without limitation, a processor output signal may transition from low to high (e.g., to thereby stop charging battery 104) when both the influencing force(s) (e.g., force output signal 111) and the temperature (e.g., battery status output signal 119) of battery 104 are observed to exceed certain limits for a certain period of time. Many other combinations of processor input values and resulting processor output values are to be appreciated and all such combinations and effects thereof are within the scope of the invention. Moreover, in some embodiments, processor 102 may produce a log (not shown) of the one or more signals it receives and/or transmits.

As described above, for example, with respect to FIG. 7B, battery assembly 704b may include three or more stacked cells 752, and a sensor 780 may be positioned between each set of adjacent cells 752 in the stack. Each sensor 780 provided between a respective set of two adjacent cells 752 in a stack of cells 752 may generate its own force output signal (e.g., force output signal 111) that may be used (e.g., by one or more processor output signals 121) to alter the performance of at least one of the cells in that set of adjacent cells. Therefore, in some embodiments, certain battery cells of a battery assembly may be independently monitored and controlled. For example, in response to battery sensor data, certain battery cells may be isolated and shutdown or otherwise altered, while other battery cells may be allowed to continue to operate normally.

Figure 6:
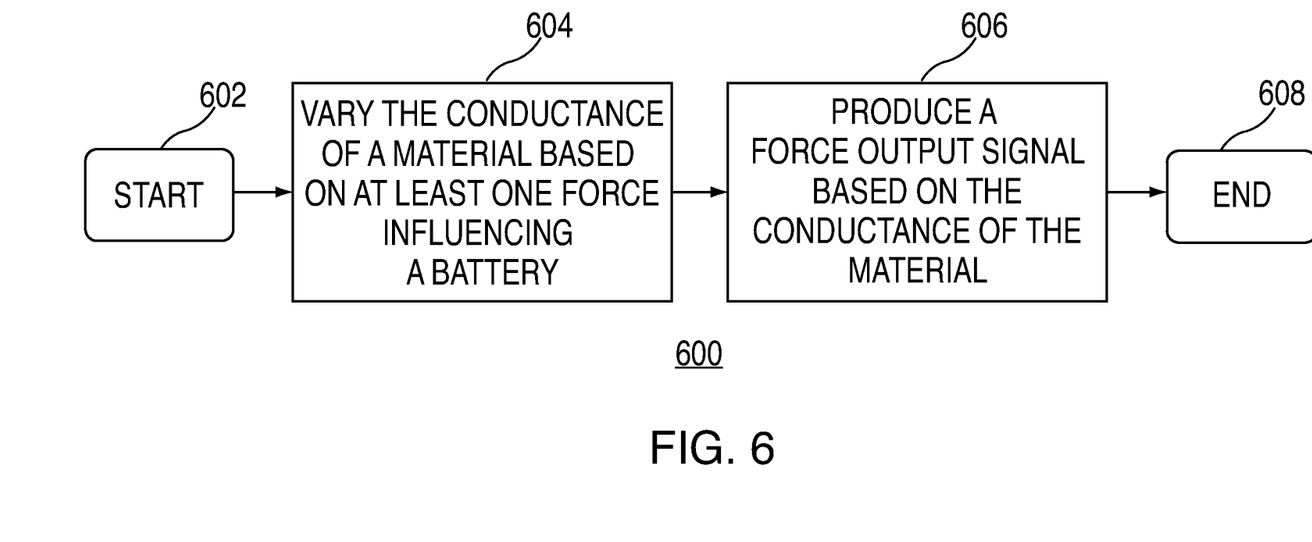
FIG. 6 shows a flowchart of various steps of a battery force detection scheme, according to some embodiments of the invention.

FIG. 6 shows a flow chart of an illustrative process 600 for monitoring and responding to at least one force influencing a battery according to some embodiments of the invention. Process 600 may start at step 602 and may then proceed to step 604 to vary the conductance of a material based on at least one force influencing a battery. The material may include at least one variable electrical conductor. The variable electrical conductor may be a quantum tunneling composite. At least a portion of the material may be coupled to an internal portion of the battery or any other suitable portion of the battery such as an external portion of the battery. The at least one force influencing the battery may be an internal force or an external force. Next, process 600 may proceed to step 606 to produce a force output signal based on the conductance of the material. A facility of the battery or a facility of any other component may then be altered based on the force output signal. Moreover, a facility of the battery or other component may be altered based on the force output signal and a battery status signal, such as a voltage or temperature of the battery, or any other status signal.

These force output signals, battery status signals, and other status signals may be any signals provided to processor 102 from any of the components described above (e.g., signals 111, 117, and 119). The signals may be evaluated to determine how to alter a facility of the battery or other component coupled to processor 102. In some embodiments and without limitation, conducting this evaluation may include filtering out transients in the one or more input signals, determining a trend of the one or more input signals, comparing one or more of the input signals to another one of the input signals or a previous input signal or a value in a lookup table, comparing one of the one or more input signals to an average-over-time of one or more of the input signals, comparing one or more of the input signals to any other type of signal available to processor 102, applying an artificial intelligence technique, utilizing an algorithm or heuristic, applying digital signal processing, running one or more of the input signals through an analog circuit, any combination thereof, and the like. One or more evaluation output signals (e.g., processor output signal 121) may be generated at least partially based on one or more evaluations. In some embodiments and without limitation, each of the one or more evaluation output signals may be an analog signal, a digital signal, a software signal, a hardware signal, a wireless signal, and the like. Each of the one or more evaluation output signals may control any facility related to the charging or maintenance of the battery and/or any facility related to the operation of any other component coupled to processor 102. Process 600 may then proceed to step 608 to stop the process, which may be repeatable and continuous in some embodiments.

The elements shown in each of FIGS. 1-9 imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the invention. Thus, while the foregoing drawings and description set forth functional aspects of the disclosed systems, no particular arrangement of software for implementing these functional aspects are to be inferred from these descriptions unless explicitly stated or otherwise clear from the context.

Similarly, it is to be appreciated that the various steps identified and described may be varied, and that the order of steps may be adapted to particular applications of the techniques disclosed herein. All such variations and modifications are intended to fall within the scope of this invention. As such, the depiction and/or description of an order for various steps should not be understood to require a particular order of execution for those steps, unless required by a particular application, or explicitly stated or otherwise clear from the context.

The methods and processes described herein, and the steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable devices, along with internal and/or external memory. The processes may also, or instead, be embodied in an application specific integrated circuit, a System-On-A-Chip, a programmable gate array, programmable array logic, or any other device or combination of devices that may be configured to process electronic signals. It is to be further appreciated that one or more of the processes may be realized as computer executable code created using a structured programming language such as C, an object oriented programming language such as C++, or any other high-level or low-level programming language, including assembly languages, hardware description languages, and database programming languages and technologies that may be stored, compiled, or interpreted to run on one of the above devices, as well as heterogeneous combinations of processors, processor architectures, or combinations of different hardware and software.

Thus, in some embodiments of the invention, each method and process described above and combinations thereof may be embodied in computer executable code that, when executing on one or more computing devices, may perform the steps thereof. In some other embodiments, the methods and processes may be embodied in systems that may perform the steps thereof, and may be distributed across devices in a number of ways, or all of the functionality may be integrated into a dedicated, standalone device or other hardware. In other embodiments, means for performing the steps associated with the processes described above may include any of the hardware and/or software described above. All such permutations and combinations are intended to fall within the scope of the invention.

References to items in the singular are to be understood to include items in the plural, and vice versa, unless explicitly stated otherwise or made clear from the context. Grammatical conjunctions are intended to express any and all disjunctive and conjunctive combinations of conjoined clauses, sentences, words, and the like, unless otherwise stated or made clear from the context.

While there have been described systems and methods for monitoring and responding to forces influencing a battery, it is to be understood that many changes may be made therein without departing from the spirit and scope of the invention. It is also to be understood that various directional and orientational terms such as "up" and "down," "left" and "right," "top" and "bottom," and the like are used herein only for convenience, and that no fixed or absolute directional or orientational limitations are intended by the use of these words. For example, the components of this invention can have any desired orientation. If reoriented, different directional or orientational terms may need to be used in their description, but that will not alter their fundamental nature as within the scope and spirit of the invention. Those skilled in the art will appreciate that the invention can be practiced by other than the described embodiments, which are presented for purposes of illustration rather than of limitation, and the invention is limited only by the claims which follow.

What is claimed is:

1. An electronic device, comprising:
    a rigid enclosure containing operational components, the operational components comprising:
    a battery cell;
    an external force sensor coupled with an exterior surface of the battery cell and configured to detect physical contact with an external surface of the battery cell, the external force sensor further configured to generate a first sense signal indicative of the contact in response to the detected contact;
    an internal force sensor positioned within the battery cell configured to detect an internal force generated by conditions internal to the battery cell, and generates a second sense signal indicative of a magnitude of the internal force in response to the detected internal force; and
    a processor coupled with the internal and the external force sensors configured to receive the first sense signal and the second sense signal and alter a facility of the electronic device based on the received first and second sense signals such that the facility of the electronic device is altered during operation of the electronic device and in response to a force detected by the external force sensor or internal force sensor.

2. The electronic device as recited in claim 1, wherein the battery cell is a first battery cell and the operational components further comprise a second battery cell.

3. The electronic device as recited in claim 2, wherein the internal force sensor is a pressure sensor configured to detect an internal pressure of the first battery cell.

4. The electronic device as recited in claim 3, wherein when the internal pressure of the first battery cell reaches or exceeds a threshold, the second sense signal causes the processor to electrically isolate and shut down the first battery cell while continuing operation of the second battery cell.

5. The electronic device as recited in claim 4, wherein the first battery cell and the second battery cell are in a stacked arrangement with each other and housed in a rigid battery case.

6. The electronic device as recited in claim 5, the electronic device further comprising a contact sensor positioned on an interior surface of the rigid battery case and configured to detect a contact with the first battery cell and/or the second battery cell and provide a contact signal.

7. The electronic device as recited in claim 6, wherein the contact signal causes the processor to alter an operation of the first and/or second battery cell.

8. The electronic device as recited in claim 1, further comprising a contact sensor positioned on an interior surface of the rigid enclosure and configured to detect a contact with the battery cell and provide a contact signal.

9. The electronic device as recited in claim 1, wherein the facility of the electronic device includes an operation related to charging or drawing current from the battery cell.

10. An electronic device, comprising:
a rigid housing containing components, the components comprising:
a processor,
a battery cell comprising an internal pressure sensor arranged to detect an internal pressure generated by conditions internal to the battery cell, the internal pressure sensor configured to send a detected pressure signal to the processor, wherein the processor is configured to respond in accordance with a threshold pressure by altering a facility of the electronic device based on the detected pressure signal, such that the facility of the electronic device is altered in response to a detected pressure;
an external force sensor coupled with an exterior surface of the battery cell and configured to detect physical contact with an external surface of the battery cell, the external force sensor further configured to generate a first sense signal indicative of the contact in response to the detected contact; and
wherein the facility altered includes operation of a cooling unit.

11. The electronic device as recited in claim 10, the electronic device further comprising an object located away from the battery cell.

12. The electronic device as recited in claim 11, wherein the object is a device component coupled to the processor and having a contact sensor arranged to detect a contact between the device component and the battery cell and provide a contact signal to the processor.

13. The electronic device as recited in claim 12, wherein the contact signal causes the processor to alter an operation of the battery cell.

14. The electronic device as recited in claim 11, wherein the object is the rigid housing having a contact sensor positioned on an interior surface of the rigid housing and arranged to detect a contact between the rigid housing and the battery cell and provide a contact signal to the processor.

15. A system for use in an electronic device having a rigid enclosure housing operational components, the operational components comprising:
a battery assembly comprising a first battery cell and a second battery cell in a stacked arrangement within a rigid case, the first and second battery cells arranged to provide power singly or cooperatively to at least some of the operational components,
an external force sensor coupled with an exterior surface of the battery cell and configured to detect physical contact with an external surface of the battery cell, the external force sensor further configured to generate a first sense signal indicative of the contact in response to the detected contact, and
a contact sensor disposed between the rigid case and the first and second battery cells and arranged to detect a physical contact with an external surface of the first or second battery cells and provide a corresponding contact signal indicative of a magnitude and duration of the physical contact; and
a processor configured to receive the contact signal and alter a facility of the battery assembly based on the received contact signal such that the facility of the electronic device is altered in response to a detected contact during operation of the system.

16. The system as recited in claim 15, wherein the contact is caused by displacement of the first and/or the second battery cell within the rigid case.

17. The system as recited in claim 16, wherein the displacement of the first and/or second battery cell is caused by an impact event at the rigid enclosure.

18. The system as recited in claim 16, wherein the contact at the rigid case is caused by an expansion of the first and/or the second battery cells.

19. The system as recited in claim 15, wherein the facility to be altered includes operation of at least one of a backlight, a hard disk, a CPU, a cooling unit, a backup system, an alarm, a dialog box, or a user interface.

20. The system as recited in claim 15, wherein the altered facility includes altering performance of the first battery cell independently from performance of the second battery cell.

* * * * *

UNITED STATES PATENT AND TRADEMARK OFFICE
CERTIFICATE OF CORRECTION

| | |
|---|---|
| PATENT NO. | : 10,923,776 B2 |
| APPLICATION NO. | : 12/625143 |
| DATED | : February 16, 2021 |
| INVENTOR(S) | : Bradley L. Spare and Robert Sean Murphy |

Page 1 of 1

It is certified that error appears in the above-identified patent and that said Letters Patent is hereby corrected as shown below:

In the Claims

Claim 1, Column 14, Line 56 delete "and generates a" and insert -- and generate a --

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*